(12) United States Patent
Han et al.

(10) Patent No.: US 11,770,617 B2
(45) Date of Patent: Sep. 26, 2023

(54) METHOD FOR TRACKING TARGET OBJECT

(71) Applicant: BOYAN TECHNOLOGIES (SHENZHEN) CO., LTD, Shenzhen (CN)

(72) Inventors: Yuxing Han, Shenzhen (CN); Jiangtao Wen, Shenzhen (CN); Yanghao Li, Shenzhen (CN); Jiawen Gu, Shenzhen (CN); Rui Zhang, Shenzhen (CN)

(73) Assignee: BOYAN TECHNOLOGIES (SHENZHEN) CO., LTD, Guangdong (CN)

( * ) Notice: Subject to any disclaimer, the term of this patent is extended or adjusted under 35 U.S.C. 154(b) by 423 days.

(21) Appl. No.: 17/038,451

(22) Filed: Sep. 30, 2020

(65) Prior Publication Data

US 2021/0250513 A1 Aug. 12, 2021

(30) Foreign Application Priority Data

Feb. 10, 2020 (CN) .......................... 202010085230.8

(51) Int. Cl.
*H04N 23/695* (2023.01)
*G06N 3/08* (2023.01)
(Continued)

(52) U.S. Cl.
CPC ............ *H04N 23/695* (2023.01); *G06N 3/08* (2013.01); *H04N 23/62* (2023.01); *H04N 23/64* (2023.01)

(58) Field of Classification Search
None
See application file for complete search history.

(56) References Cited

U.S. PATENT DOCUMENTS

2018/0364331 A1* 12/2018 Yamasaki ............. G01S 13/931
2020/0051250 A1* 2/2020 Cao ......................... G06T 7/248

FOREIGN PATENT DOCUMENTS

CN 107333040 A 11/2017
CN 108375774 A 8/2018
(Continued)

OTHER PUBLICATIONS

Ulku, Arin Can et al., "A 512 × 512 SPAD Image Sensor With Integrated Gating for Widefield FLIM", IEEE Journal of Selected Topics in Quantum Electronics; vol. 25, No. 1, Jan./Feb. 2019, 12 pages.

(Continued)

*Primary Examiner* — Daniel T Tekle
(74) *Attorney, Agent, or Firm* — TUCKER ELLIS LLP

(57) ABSTRACT

A method for tracking target object, storage medium and electronic device, which relate to the field of an image processing technology. The method includes: receiving at least one target image captured by a single photon avalanche diode (SPAD) camera before present moment; for each target image, inputting the target image and a preset template image into a pre-trained siamese network to acquire a position of a target object in the target image output by the siamese network, wherein the template image includes the target object; and determining a position of the target object in an image to be predicted based on the position of the target object in each target image, wherein the image to be predicted is an image captured by the SPAD camera at the present moment.

9 Claims, 4 Drawing Sheets

(51) Int. Cl.
    *H04N 23/62*      (2023.01)
    *H04N 23/60*      (2023.01)

(56) References Cited

FOREIGN PATENT DOCUMENTS

| | | |
|---|---|---|
| CN | 109191491 A | 1/2019 |
| CN | 109272530 A | 1/2019 |
| CN | 109446889 A | 3/2019 |
| CN | 109543559 A | 3/2019 |
| CN | 110287874 A | 9/2019 |
| CN | 110443827 A | 11/2019 |
| CN | 110766724 A | 2/2020 |
| EP | 3438699 A1 | 2/2019 |

OTHER PUBLICATIONS

Li, Bo et al., "High performance visual tracking with siamese region proposal network", Proceedings of the IEEE Conference on Computer Vision and Pattern Recognition, 2018, 10 pages.

Zhu, Zheng et al., "Distractor-aware siamese networks for visual object tracking", Proceedings of the European Conference on Computer Vision, 2018, 17 pages.

* cited by examiner

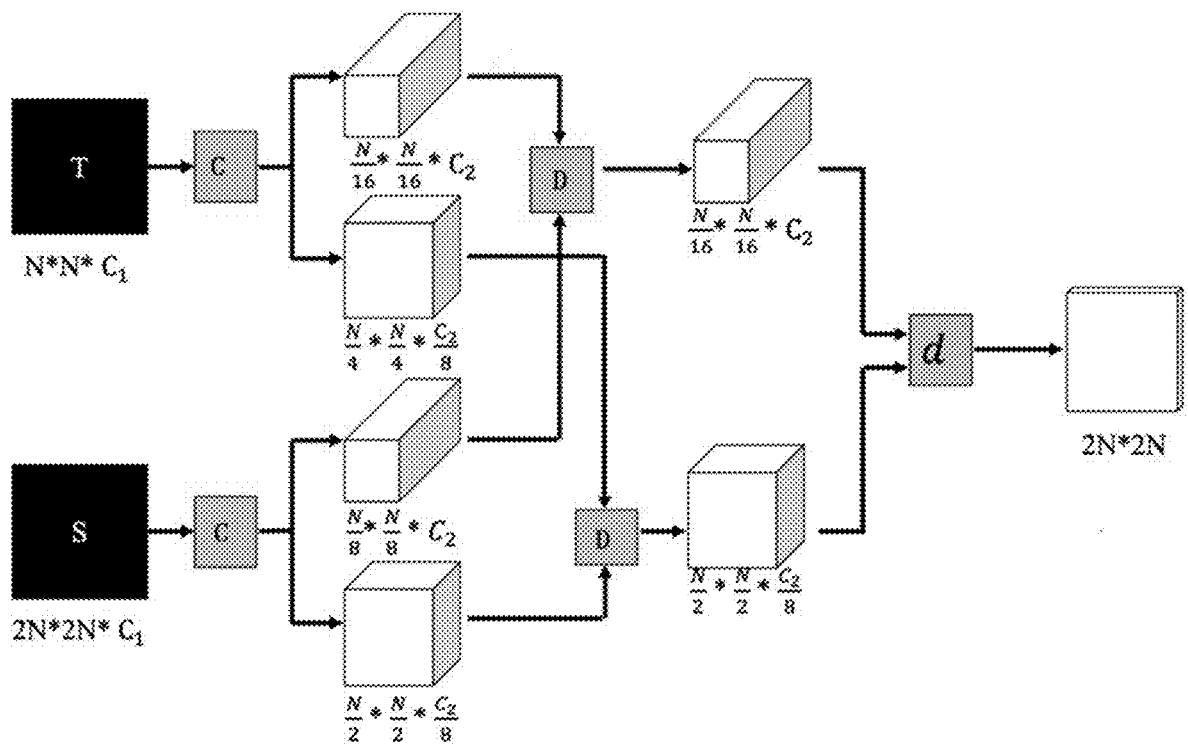

Determining, in each target image, whether a first pixel position belongs to the position of the target object

1032

Determining the first pixel position to belong to the position of the target object in the image to be predicted if the number of the target images in which the first pixel position belongs to the position of the target is greater than a preset threshold

Fig. 4

METHOD FOR TRACKING TARGET OBJECT

CROSS-REFERENCE TO RELATED APPLICATION

The present application claims priority benefits to Chinese Patent Application No. 202010085230.8, filed on Feb. 10, 2020, the content of which is incorporated herein by reference in its entirety.

TECHNICAL FIELD

The present disclosure relates to the field of an image processing technology, in particular to method for tracking target object, storage medium and electronic device.

BACKGROUND

With the constant progress of an image processing technology, visual object tracking has been widely applied to the fields of video monitoring, human-machine interaction and unmanned driving. Object tracking is to predict the position of a target object in the subsequent images based on the given multi-frame continuous images. The target object may be designated person, physical object or certain part of human body or physical object. Generally the object tracking technology is based upon a large amount of red-green-blue (RGB) color space data. Massive data occupies the bandwidth during transmission and processing, with heavy computation, high complexity and large power consumption, which easily results in time delay.

SUMMARY

The present disclosure aims to provide method for tracking target object, storage medium and electronic device.

According to the first aspect of the embodiments of the present disclosure, a method for tracking target object is provided, wherein the method comprises: receiving at least one target image captured by a single photon avalanche diode (SPAD) camera before present moment; for each target image, inputting the target image and a preset template image into a pre-trained siamese network to acquire a position of a target object in the target image output by the siamese network, wherein the template image includes the target object; and determining a position of the target object in an image to be predicted based on the position of the target object in each target image, wherein the image to be predicted is an image captured by the SPAR camera at the present moment.

Optionally, the inputting the target image and the preset template image into the pre-trained siamese network to acquire the position of the target object in the target image output by the siamese network comprises: dividing the target image based on a preset detection area to obtain a detection image corresponding to the target image; and inputting the detection image and the template image into the siamese network to acquire the position of the target object in the detection image output by the siamese network.

Optionally, the inputting the detection image and the template image into the siamese network to acquire the position of the target object in the detection image output by the siamese network comprises: inputting the detection image into a convolutional neural network (CNN) in the siamese network to obtain a first high-level feature and a first low-level feature output by the CNN; inputting the template image into the CNN to obtain a second high-level feature and a second low-level feature output by the CNN; inputting the first high-level feature and the second high-level feature into a cross-correlation convolutional layer to obtain a high-level feature output by the cross-correlation convolutional layer, and inputting the first low-level feature and the second low-level feature into the cross-correlation convolutional layer to obtain a low-level feature output by the cross-correlation convolutional layer; and determining the position of the target object in the detection image based on the high-level feature output by the cross-correlation convolutional layer and the low-level feature output by the cross-correlation convolutional layer.

Optionally, the determining the position of the target object in the detection image based on the high-level feature output by the cross-correlation convolutional layer and the low-level feature output by the cross-correlation convolutional layer comprises: performing cross-relation convolution for the high-level feature output by the cross-correlation convolutional layer and the low-level feature output by the cross-correlation convolutional layer to obtain a general feature; inputting the general feature into a softmax layer in the siamese network to obtain matching rate of each pixel point in the detection image with the target object output by the softmax layer; and determining the position of the target object in the detection image based on the matching rate of each pixel point in the detection image with the target object.

Optionally, the determining the position of the target object in the image to be predicted based on the position of the target object in each target image comprises: determining, in each target image, whether a first pixel position belongs to the position of the target object, wherein the first pixel position is any pixel position in image captured by the SPAD camera; and determining the first pixel position to belong to the position of the target object in the image to be predicted if the number of the target images in which the first pixel position belongs to the position of the target is greater than a preset threshold.

According to the second aspect of the embodiments of the present disclosure, a non-temporary computer-readable storage medium on which a computer program is stored is provided, wherein a method for tracking target object is carried out when the program is executed by a processor; wherein the method comprises: receiving at least one target image captured by a single photon avalanche diode (SPAD) camera before present moment; for each target image, inputting the target image and a preset template image into a pre-trained siamese network to acquire a position of a target object in the target image output by the siamese network, wherein the template image includes the target object; and determining a position of the target object in an image to be predicted based on the position of the target object in each target image, wherein the image to be predicted is an image captured by the SPAD camera at the present moment.

According to the third aspect of the embodiments of the present disclosure, an electronic device is provided, wherein the electronic device comprises: a memory, on which a computer program is stored; and a processor configured to execute the computer program in the memory to carry out a method for tracking target object comprising: receiving at least one target image captured by a single photon avalanche diode (SPAD) camera before present moment; for each target image, inputting the target image and a preset template image into a pre-trained siamese network to acquire a position of a target object in the target image output by the siamese network, wherein the template image includes the target object; and determining a position of the target object in an image to be predicted based on the position of the target object in each target image, wherein the image to be predicted is an image captured by the SPAD camera at the present moment.

According to the present disclosure, the target may be tracked based on the image captured by the SPAD camera, which reduces data computation and complexity and reduces the bandwidth occupied by data, thereby decreasing target tracking power consumption and time delay.

Other features and advantages of the present disclosure will be elaborated in the following Detailed Description.

BRIEF DESCRIPTION OF DRAWINGS

A more detailed understanding may be had from the following description, given by way of example in conjunction with the accompanying drawings wherein:

FIG. 3 illustrates a diagram of a siamese network shown in an exemplary embodiment.

FIG. 4 illustrates a flow chart of another method for tracking target object shown in an exemplary embodiment.

DETAILED DESCRIPTION

Figure 1:
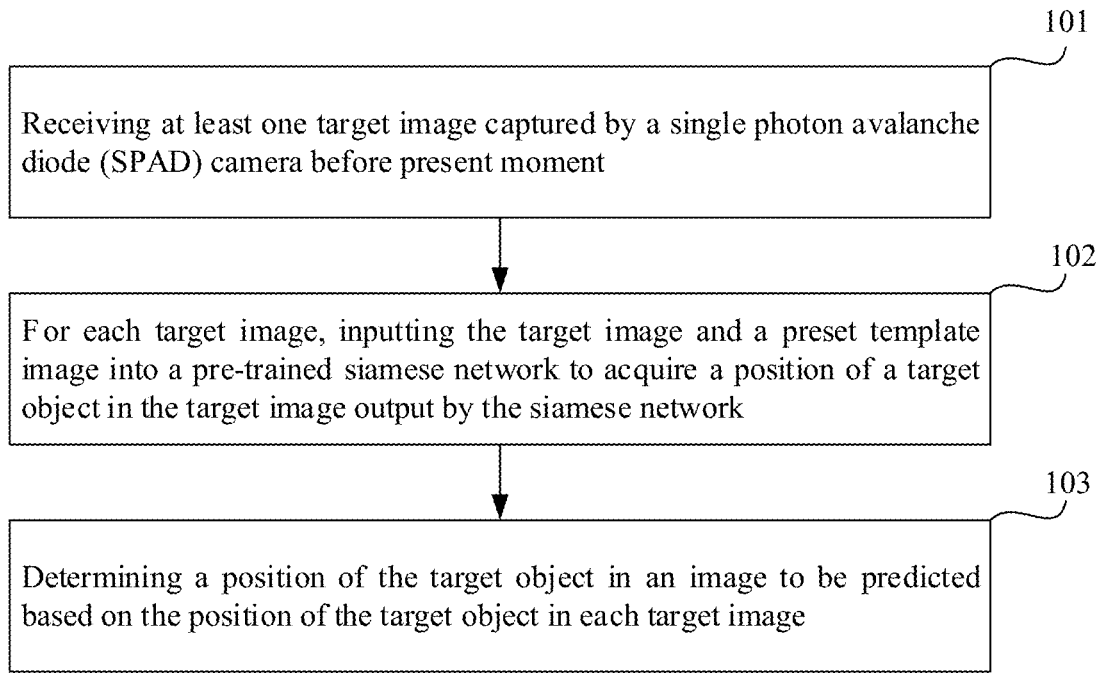
FIG. 1 illustrates a flow chart of method for tracking target object shown in an exemplary embodiment.

These exemplary embodiments will be elaborated here, and the examples thereof will be indicated in the drawings. Unless otherwise indicated, same numerals in different drawings referred to the same or similar elements. The implementations depicted in the exemplary embodiments are not intended to represent all implementations consistent with the present disclosure. On the contrary, they are merely examples of apparatus and method consistent with some aspects of the present disclosure as detailed in the appended claims.

FIG. 1 illustrates a flow chart of method for tracking target object shown in an exemplary embodiment. As shown in FIG. 1, the method may comprise the following steps.

In step 101, at least one target image captured by a single photon avalanche diode (SPAD) camera before a present moment is received.

For instance, the images (including the target image and the image to be predicted mentioned subsequently) involved in the embodiments of the present disclosure are all captured by the SPAD camera. These images are generally low in precision (1-bit). Firstly, one or a plurality of target images captured continuously by the SPAD camera before the present moment are received. For instance, $2^k-1$ target images captured by the SPAD camera may be received, where k is a positive integer.

In step 102, for each target image, the target image and a preset template image are input into a pre-trained siamese network to acquire a position of a target object in the target image output by the siamese network, wherein the template image includes the target object.

For example, for each target image, the target image and the preset template image are input into the pre-trained siamese network. The template image includes the target object. It can be understood that massive images including the target object are captured in advance, and the image(s) that may mostly represent the target object may be selected as the template image therefrom. The target object may be designated person, physical object or certain part of human body or physical object. The target image is generally greater than the template image, for instance, the size of the target image is 5N*5N, while the size of the template image is N*N. Siamese network may include a convolutional neural network (CNN) and a cross-correlation convolutional layer. It can be understood that each target image is input into the CNN to extract feature data of the target image, and the template image is input into the CNN to extract feature data of the template image, and then the feature data of the target image and the template image passes through the cross-correlation convolutional layer to determine the level of similarity between the target image and the template image, in order to determine the position of the target object in the target image. The position of the target object in the target image may be understood as pixel position (namely pixel coordinate), i.e., which the pixel positions in the target image belong to the target object.

It should be noted that the siamese network may include two completely same convolutional neural networks respectively used for extracting feature data of the target image and the template image, or may only include one convolutional neural network used for both extracting the feature data of the target image and the template image. The above siamese network may be fully-convolutional (SiamFC) network or region proposal network (SiamRPN), or other type of siamese networks.

In step 103, the position of the target object in the image to be predicted is determined based on the position of the target object in each target image, wherein the image to be predicted is the image captured by the SPAD camera at the present moment.

For example, the position of the target object in the image to be predicted captured by the SPAD camera at the present moment may be determined in combination with the position of the target object in each target image after the position of the target object in each target image is acquired. The target image and the image to be predicted are both captured by the SPAD camera, such that the target image and the image to be predicted are of the same dimensions, and the number of pixels included in the target image are equal to the number of pixels included in the image to be predicted. By the way of for the same pixel position in each target image, counting the pixel positions determined to belong to the target object, and then ordering all pixel positions based on the counts in a descending manner, the pixel positions of the preset number sorted ahead may be determined as the positions of the target objects in the image to be predicted. For instance, there are ten target images. If the pixel positions (10, 57) in the ten target images are determined to belong to the target object, then the hit count of (10, 57) is 10. Alternatively, if the pixel positions (20, 60) in nine target images are determined to belong to the target object, and the pixel position (20, 60) in the one target image is not determined to belong to the target object, then the hit count of (20, 60) is 9. In a similar way, the hit count of each pixel position may be determined, and the pixel position with high hit count is determined as the position of the target object in the image to be predicted.

According to the present disclosure, the target may be tracked based on the image captured by the SPAD camera. The data size of images captured by the SPAD camera is generally small, for example 1-bit, so that compared with RGB data in the prior art, the amount of data can be greatly reduced during transmission and processing, data computation and complexity can be lowered, and the bandwidth occupied by the data can be reduced, thereby decreasing target tracking power consumption and time delay.

Figure 2:
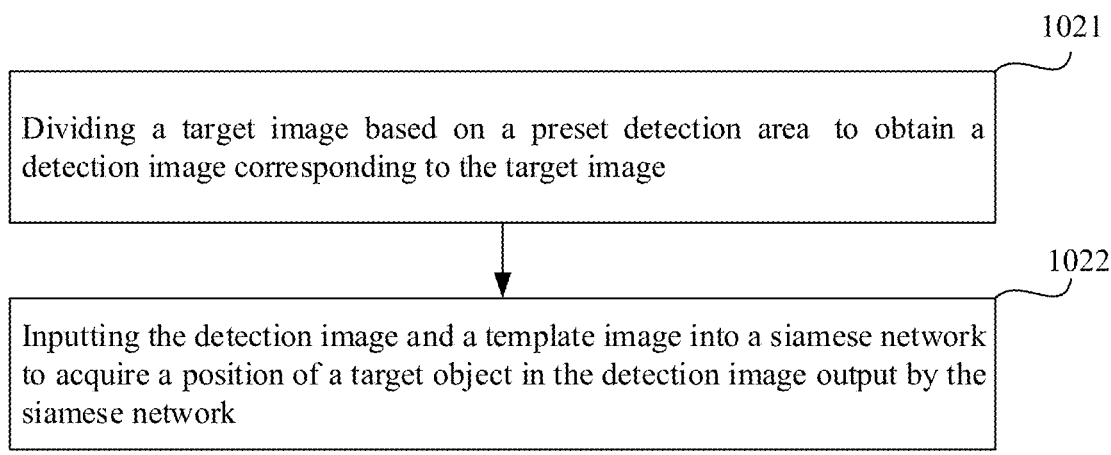
FIG. 2 illustrates a flow chart of another method for tracking target object shown in an exemplary embodiment.

FIG. 2 illustrates a flow chart of another method for tracking target object shown in an exemplary embodiment. As shown in FIG. 2, the step 102 may comprise the following steps.

In step 1021, the target image is divided based on a preset detection area to obtain a detection image corresponding to the target image.

In step 1022, the detection image and the template image are input into a siamese network to acquire a position of the target object in the detection image output by the siamese network.

The target image may be preprocessed to further reduce the amount of data, for example, the target image may be divided based on the preset detection area, and a part indicated by the detection area in the target image is determined as the detection image. The detection area may refer to an area range of the target object, which can be designated in advance, or can be determined based on the position of the target object determined when the steps 101-103 are carried out at the last moment. For instance, the size of the target image is 5N*5N, while the size of the detection image is 2N*2N. Then, the detection and template images are input into the siamese network to acquire the position of the target object in the detection image output by the siamese network.

In the prior art, due to data in RGB color space is generally data with low frame rate, the deformation and movement of objects are relatively large from frame to frame, such that the detection area selected from each image is large (generally 16 times of the target object), which results in large amount of data to be processed. The SPAD camera features ultrahigh frame rate (for instance, 97.7 kfps), high dynamic range and small deformation and movement of the objects from frame to frame. Therefore, the detection area (for instance, 4 times of the target object) provided in the embodiments of the present disclosure is smaller than the detection area provided based on the data in the RGB color space. Correspondingly, the amount of data can be further reduced during transmission and processing, the data computation and complexity can be further lowered, and the bandwidth occupied by the data can be further reduced, thereby further decreasing target tracking power consumption and time delay.

FIG. 3 illustrates a diagram of a siamese network shown in an exemplary embodiment. As shown in FIG. 3, the siamese network may include at least one preset convolutional neural network C, at least one cross-correlation convolutional layer D and a cross-correlation convolution operation unit d. Correspondingly, the step 1022 may comprise:

step 1): inputting a detection image into a convolutional neural network in the siamese network to obtain a first high-level feature and a first low-level feature output by the CNN;

step 2): inputting a template image into the CNN to obtain a second high-level feature and a second low-level feature output by the CNN;

step 3): inputting the first high-level feature and the second high-level feature into the cross-correlation convolutional layer to obtain a high-level feature output by the cross-correlation convolutional layer, and inputting the first low-level feature and the second low-level feature into the cross-correlation convolutional layer to obtain a low-level feature output by the cross-correlation convolutional layer; and step 4): determining a position of a target object in the detection image based on the high-level feature output by the cross-correlation convolutional layer and the low-level feature output by the cross-correlation convolutional layer.

For example, the detection image (S in FIG. 3) is input into the CNN to obtain a first high-level feature and a first low-level feature of the detection image. Meanwhile, the template image (T in FIG. 3) is input into the CNN to obtain a second high-level feature and a second low-level feature of the template image. The CNN may have been pre-trained already and used to extract the features (including high-level feature and the low-level feature) of designation layer of image. The first high-level feature and the first low-level feature respectively reflect feature data of the detection image in different spatial resolutions. Similarly, the second high-level feature and the second low-level feature respectively reflect feature data of the template image in different spatial resolutions. Specifically, the convolution layers through which the first high-level feature of the detection image passes are more than the convolution layers through which the first low-level feature passes. Correspondingly, the feature dimension of the first high-level feature is high and the spatial resolution thereof is low, and the feature dimension of the first low-level feature is low and the spatial resolution thereof is high. Similarly, the convolution layers through which the second high-level feature of the template image passes are more than the convolution layers through which the second low-level feature passes. Correspondingly, the feature dimension of the second high-level feature is high and the spatial resolution thereof is low, and the feature dimension of the second low-level feature is low and the spatial resolution thereof is high.

For example, there are $2^k-1$ target images and $2^k-1$ detection images. The size of the detection image is 2N*2N, while the size of the template image is N*N. Assumed that the number of passages of the CNN is $C_1$, where $C_1=2^k-2$, then the detection image that is input into the CNN is 2N*2N*$C_1$ dimension data, and correspondingly the size of the first high-level feature output by the CNN is (N/8)*(N/8)*$C_2$, where (N/8)*(N/8) represents the spatial resolution, and $C_2$ represents the feature dimension. The size of the first low-level feature is (N/2)*(N/2)*($C_2$/8), where (N/2)*(N/2) represents the spatial resolution, and ($C_2$/8) represents the feature dimension. The template image that is input into the CNN is N*N*$C_1$ dimension data, and correspondingly the size of the second high-level feature output by the CNN is (N/16)*(N/16)*$C_2$, where (N/16)*(N/16) represents the spatial resolution, and $C_2$ represents the feature dimension. The size of the second low-level feature is (N/4)*(N/4)*($C_2$/8), where (N/4)*(N/4) represents the spatial resolution, and ($C_2$/8) represents the feature dimension.

Then, the first high-level feature and the second high-level feature are input into a cross-correlation convolutional layer to obtain the high-level feature output by the cross-correlation convolutional layer, wherein the size of the high-level features is (N/16)*(N/16)*$C_2$. Meanwhile, the first low-level feature and the second low-level feature are input into a cross-correlation convolutional layer to obtain the low-level feature output by the cross-correlation convolutional layer, wherein the size of the low-level features is (N/2)*(N/2)*($C_2$/8). The high-level feature output by the cross-correlation convolutional layer may reflect the level of similarity between the first high-level feature and the second high-level feature, and the low-level feature output by the cross-correlation convolutional layer may reflect the level of similarity between the first low-level feature and the second low-level feature. Correspondingly, the spatial resolution is low when the feature dimension of the high-level feature output by the cross-correlation convolutional layer is high; and the spatial resolution is high when the feature dimension of the low-level feature output by the cross-correlation convolutional layer is low. Finally, the position of the target object in the detection image is determined based on the high-level feature output by the cross-correlation convolutional layer and the low-level feature output by the cross-correlation convolutional layer.

In a specific application scenario, the implementation method of determining the position of the target object in the detection image based on the high-level feature and the low-level feature may comprise:

firstly, performing cross-relation convolution for the high-level feature output by the cross-correlation convolutional layer and the low-level feature output by the cross-correlation convolutional layer to obtain a general feature;

secondly, inputting the general feature into a softmax layer in the siamese network to obtain matching rate of each pixel point in the detection image with the target object output by the softmax layer; and finally, determining the position of the target object in the detection image based on the matching rate of each pixel point in the detection image with the target object.

For example, the siamese network shown in FIG. 3 further includes the cross-correlation convolution operation unit d and the softmax layer (not shown in the FIG. 3) of a space domain. Firstly, the high-level feature output by the cross-correlation convolutional layer and the low-level feature output by the cross-correlation convolutional layer determined in step 3) are input into the cross-correlation convolution operation unit for cross-correlation convolution operation, and a cross-correlation convolution result is determined as the general feature. Finally, the general feature is input into the softmax layer, each pixel point in the detection image is classified by the softmax layer to obtain matching rate of each pixel point in the detection image with the target object output by the softmax layer, and then the position of the pixel point, the matching rate of which is greater than a preset matching rate threshold, is determined as the position of the target object in the detection image. It can be understood that each detection image and the template image are input into the siamese network to obtain a 2N*2N prediction map and the position of the target object in the prediction map.

FIG. 4 illustrates a flow chart of another method for tracking target object shown in an exemplary embodiment. As shown in FIG. 4, the step 103 may comprise the following steps.

In step 1031, it is determined that, in each target image, whether a first pixel position belongs to the position of the target object, wherein the first pixel position is any pixel position in image captured by the SPAD camera.

In step 1032, it is determined that the first pixel position belongs to the position of the target object in the image to be predicted if the number of the target images in which the first pixel position belongs to the position of the target is greater than a preset threshold.

For example, if there are $2^k-1$ target images, the step 102 is executed $2^k-1$ times to obtain the position of the target object in the $2^k-1$ target images, wherein the position of the target object in the $2^k-1$ target images can be obtained once by means of parallel processing. On account that the target image and the image to be predicted are captured by the SPAD camera, the target image and the image to be predicted have the same dimensions, and the pixels included in the target image are equal to the ones included in the image to be predicted. Whether each pixel position belongs to the position of the target object may be determined in each target image first. For the first pixel position, the first pixel position may be determined to belong to the position of the target object in the image to be predicted if in the $2^k-1$ target images, the number of the target images in which the first pixel position belongs to the position of the target object is greater than a preset threshold. The position of the target object in the image to be predicted may be obtained by successively determining whether each pixel position belongs to the position of the target object.

It should be noted that the siamese network in the above embodiments may be trained by the following methods: acquiring a sample input set and a sample output set, wherein each sample input in the sample input set includes a sample image, and the sample output set includes a sample output corresponding to each sample input respectively, wherein each sample output includes the position of the target object in the corresponding sample image which includes the target object captured by the SPAD camera.

The sample input set is used as the input of the siamese network and the sample output set is used as the output of the siamese network to train the siamese network.

In a specific application scenario, the massive images including the target object captured by the SPAD camera may be used as the sample images, and then the positions of the target object in the sample images are marked as the corresponding sample outputs. The siamese network may be trained by using the sample input set as the input of the siamese network and using the sample output set as the output of the siamese network, so that the position of the target object in the sample image output by the siamese network can be matched with the sample output set if the sample input set is input into the siamese network.

Figure 5:
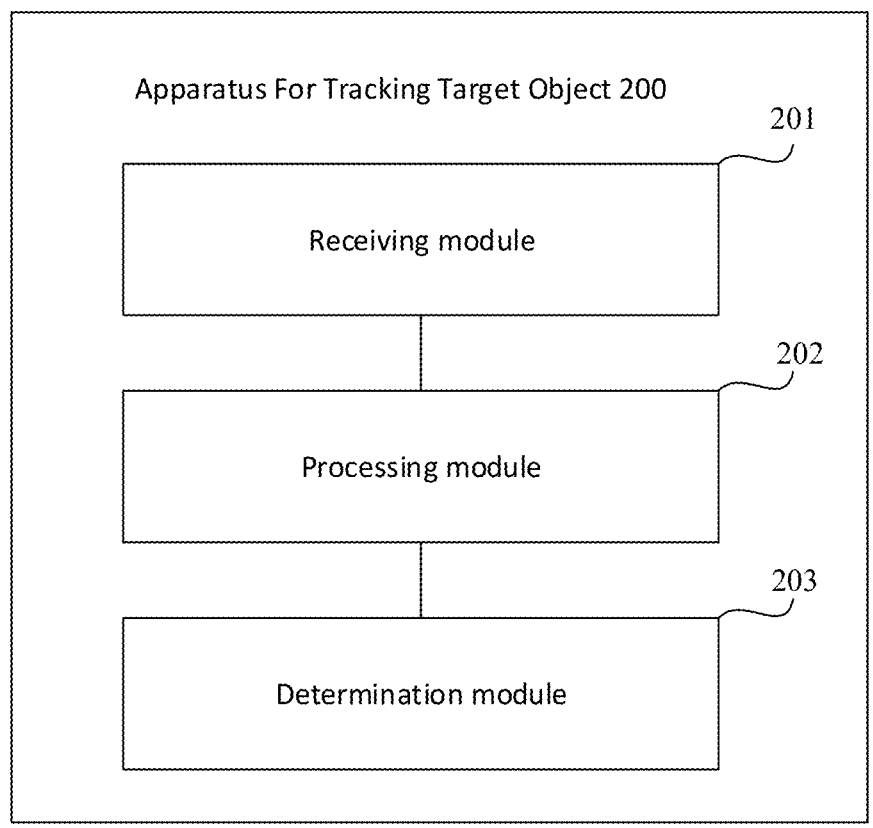
FIG. 5 illustrates a block diagram of an apparatus for tracking target object shown in an exemplary embodiment.

FIG. 5 illustrates a block diagram of an apparatus for tracking target object shown in an exemplary embodiment. As shown in FIG. 5, the apparatus 200 may comprise:

a receiving module 201 configured to receive at least one target image captured by a single-photon avalanche diode (SPAD) camera before the present moment;

a processing module 202 configured to for each target image, input the target image and a preset template image into a pre-trained siamese network to acquire a position of a target object in the target image output by the siamese network, wherein the template image includes the target object; and a determination module 203 configured to determine a position of the target object in an image to be predicted based on the position of the target object in each target image, wherein the image to be predicted is an image captured by the SPAD camera at the present moment.

Figure 6:
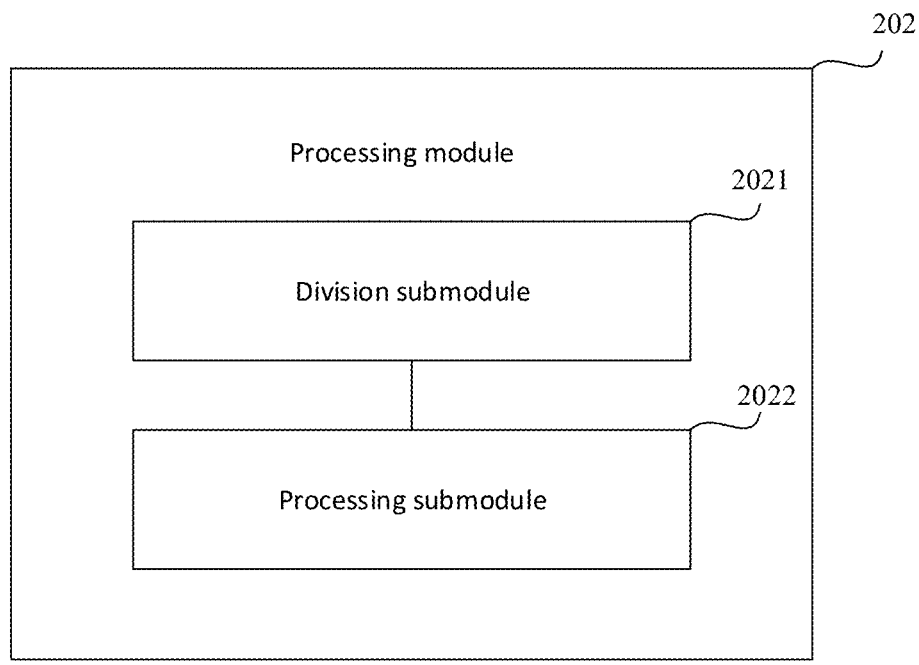
FIG. 6 illustrates a block diagram of another apparatus for tracking target object shown in an exemplary embodiment.

FIG. 6 illustrates a block diagram of another apparatus for tracking target object shown in an exemplary embodiment. As shown in FIG. 6, the processing module 202 may comprise:

a division submodule 2021 configured to divide a target image based on a preset detection area to obtain a detection image corresponding to the target image; and a processing submodule 2022 configured to input the detection image and a template image into a siamese network to acquire a position of the target object in the detection image output by the siamese network.

Optionally, the processing submodule 2022 may be configured to input a detection image into a convolutional neural network (CNN) in the siamese network to obtain a first high-level feature and a first low-level feature output by the CNN; input a template image into the CNN to obtain a second high-level feature and a second low-level feature output by the CNN; input the first high-level feature and the second high-level feature into the cross-correlation convolutional layer to obtain a high-level feature output by the cross-correlation convolutional layer, and inputting the first low-level feature and the second low-level feature into the cross-correlation convolutional layer to obtain a low-level feature output by the cross-correlation convolutional layer; and determine the position of the target object in the detection image based on the high-level feature output by the cross-correlation convolutional layer and the low-level feature output by the cross-correlation convolutional layer.

To be specific, the processing submodule 2022 may be configured to perform cross-relation convolution for the high-level feature output by the cross-correlation convolutional layer and the low-level feature output by the cross-correlation convolutional layer to obtain a general feature; input the general feature into a softmax layer in the siamese network to obtain matching rate of each pixel point in the detection image with the target object output by the softmax layer; and determine the position of the target object in the detection image based on the matching rate of each pixel point in the detection image with the target object.

Optionally, the determination module 203 may be configured to determine, in each target image, whether a first pixel position belongs to the position of the target object, and determine the first pixel position to belong to the position of the target object in the image to be predicted if the number of the target images in which the first pixel position belongs to the position of the target is greater than a preset threshold, wherein the first pixel position is any pixel position in each image captured by the SPAR camera.

With respect to the apparatus in the above embodiments, the specific operating ways of all modules have been elaborated in the embodiments with regard to the method, which will not be elaborated here.

In conclusion, according to the apparatus for tracking target object of the present disclosure, the target can be tracked based on the image captured by the SPAD camera, which reduces data computation and complexity and reduces the bandwidth occupied by data, thereby decreasing target tracking power consumption and time delay.

Figure 7:
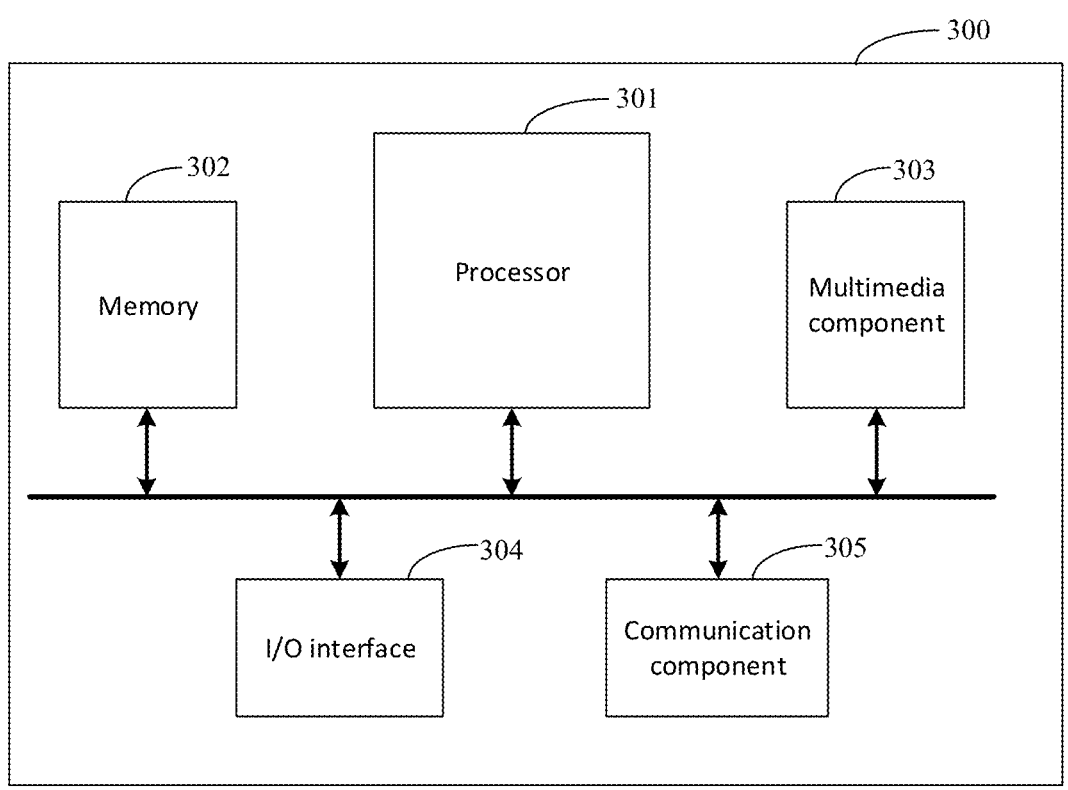
FIG. 7 illustrates a block diagram of an electronic device shown in an exemplary embodiment.

FIG. 7 illustrates a block diagram of an electronic device 300 shown in an exemplary embodiment. As shown in FIG. 7, the electronic device 300 may include a processor 301 and a memory 302. The electronic device 300 may also include one or more of a multimedia component 303, an input/output (I/O) interface 304 and a communication component 305.

The processor 301 is configured to control the overall operation of the electronic device 300 to complete all or a part of steps in the above method for tracking target object. The memory 302 is configured to store various types of data to support operations at the electronic device 300. These data, for instance, may include instructions for operating any application program or method on the electronic device 300, and the related application data of the application program, for example, contact data, sent and received messages, pictures, audio, videos, and so on. The memory 302 can be implemented by any type of volatile or non-volatile memory device or combination thereof, such as a Static Random Access Memory (referred to as SRAM), an Electrically Erasable Programmable Read-Only Memory (referred to as EEPROM), an Erasable Programmable Read-Only Memory (referred to as EPROM), a Programmable Read-Only Memory (referred to as PROM), a Read-Only Memory (referred to as ROM), a magnetic memory, a flash memory, a magnetic disk or an optical disk. The multimedia component 303 may include a screen and an audio component. The screen, for example, a touch screen. The audio component is configured to output and/or input an audio signal. For example, the audio component may include a microphone for receiving an external audio signal. The received audio signal can be further stored in the memory 302 or sent by the communication component 305. The audio component further includes at least one loudspeaker for outputting the audio signal. The I/O interface 304 provides an interface between the processor 301 and other interface modules. The other interface modules can be keyboards, mice, buttons, and the like. These buttons can be virtual or physical buttons. The communication component 305 is configured to wire or wireless communication between the electronic device 300 and other devices. The wireless communication includes, such as, Near Field Communication (referred to as NFC), 2G, 3G, 4G, NB-IOT, eMTC, or other 5G and the like, or the combination of one or more of them, and it is not limited herein. Therefore, the corresponding communication component 305 may include: a Wi-Fi module, a Bluetooth module, an NFC module, and the like.

In an exemplary embodiment, the electronic device 300 may be implemented by one or more Application Specific Integrated Circuits (referred to as ASICs), Digital Signal Processor (referred to as DSP), Digital Signal Processing Device (referred to as DSPD), Programmable Logic Device (referred to as PLD), Field Programmable Gate Array (referred to as FPGA), controllers, microcontrollers, microprocessors or other electronic components, and is configured to execute the above method for tracking target object.

In another exemplary embodiment, a non-temporary computer-readable storage medium, on which a computer program is stored, is further provided, and the program instructions implement the steps of the method for tracking target object described above when being executed by the processor. For example, the computer-readable storage medium can be the above memory 302 including the program instructions, and the program instructions can be executed by the processor 301 of the electronic device 300 to complete the method for tracking target object described above.

In another exemplary embodiment, a computer program product is further provided. The computer program product includes a computer program executed by a programmable apparatus, and the computer program has a code portion for executing the above method for tracking target object when being executed by the programmable apparatus.

The preferred embodiments of the present disclosure have been described in detail above with reference to the drawings. However, the present disclosure is not limited to the specific details in the above embodiments, various simple modifications can be made to the technical solutions of the present disclosure within the scope of the technical concept of the present disclosure, and these simple variations are all within the protection scope of the present disclosure.

It should be further noted that the specific technical features described in the above specific embodiments can be combined in any suitable manner without contradiction. In order to avoid unnecessary repetition, various possible combinations are not additionally illustrated in the present disclosure.

In addition, various different embodiments of the present disclosure can be randomly combined, and the combinations should also be regarded as the contents disclosed by the present disclosure as long as not deviating from the spirit of the present disclosure.

The invention claimed is:

1. A method for tracking target object, comprising:
   receiving at least one target image captured by a single photon avalanche diode (SPAD) camera before present moment;
   for each target image, inputting the target image and a preset template image into a pre-trained siamese network to acquire a position of a target object in the target image output by the siamese network, wherein the template image includes the target object; and
   determining a position of the target object in an image to be predicted based on the position of the target object in each target image, wherein the image to be predicted is an image captured by the SPAD camera at the present moment;
   wherein the inputting the target image and the preset template image into the pre-trained siamese network to acquire the position of the target object in the target image output by the siamese network comprises:
   dividing the target image based on a preset detection area to obtain a detection image corresponding to the target image; and
   inputting the detection image and the template image into the siamese network to acquire the position of the target object in the detection image output by the siamese network;
   wherein the inputting the detection image and the template image into the siamese network to acquire the position of the target object in the detection image output by the siamese network comprises:
   inputting the detection image into a convolutional neural network (CNN) in the siamese network to obtain a first high-level feature and a first low-level feature output by the CNN;
   inputting the template image into the CNN to obtain a second high-level feature and a second low-level feature output by the CNN;
   inputting the first high-level feature and the second high-level feature into a cross-correlation convolutional layer to obtain a high-level feature output by the cross-correlation convolutional layer, and inputting the first low-level feature and the second low-level feature into the cross-correlation convolutional layer to obtain a low-level feature output by the cross-correlation convolutional layer; and
   determining the position of the target object in the detection image based on the high-level feature output by the cross-correlation convolutional layer and the low-level feature output by the cross-correlation convolutional layer.

2. The method of claim 1, wherein the determining the position of the target object in the detection image based on the high-level feature output by the cross-correlation convolutional layer and the low-level feature output by the cross-correlation convolutional layer comprises:
   performing cross-relation convolution for the high-level feature output by the cross-correlation convolutional layer and the low-level feature output by the cross-correlation convolutional layer to obtain a general feature;
   inputting the general feature into a softmax layer in the siamese network to obtain matching rate of each pixel point in the detection image with the target object output by the softmax layer; and
   determining the position of the target object in the detection image based on the matching rate of each pixel point in the detection image with the target object.

3. The method of claim 1, wherein the determining the position of the target object in the image to be predicted based on the position of the target object in each target image comprises:
   determining, in each target image, whether a first pixel position belongs to the position of the target object, wherein the first pixel position is any pixel position in image captured by the SPAD camera; and
   determining the first pixel position to belong to the position of the target object in the image to be predicted if the number of the target images in which the first pixel position belongs to the position of the target is greater than a preset threshold.

4. A non-transitory computer-readable storage medium, on which a computer program is stored, wherein a method for tracking target object is carried out when the program is executed by a processor; wherein the method comprises:
   receiving at least one target image captured by a single photon avalanche diode (SPAD) camera before present moment;
   for each target image, inputting the target image and a preset template image into a pre-trained siamese network to acquire a position of a target object in the target image output by the siamese network, wherein the template image includes the target object; and
   determining a position of the target object in an image to be predicted based on the position of the target object in each target image, wherein the image to be predicted is an image captured by the SPAD camera at the present moment;
   wherein the inputting the target image and the preset template image into the pre-trained siamese network to acquire the position of the target object in the target image output by the siamese network comprises:
   dividing the target image based on a preset detection area to obtain a detection image corresponding to the target image; and
   inputting the detection image and the template image into the siamese network to acquire the position of the target object in the detection image output by the siamese network;
   wherein the inputting the detection image and the template image into the siamese network to acquire the position of the target object in the detection image output by the siamese network comprises:
   inputting the detection image into a convolutional neural network (CNN) in the siamese network to obtain a first high-level feature and a first low-level feature output by the CNN;
   inputting the template image into the CNN to obtain a second high-level feature and a second low-level feature output by the CNN;
   inputting the first high-level feature and the second high-level feature into a cross-correlation convolutional layer to obtain a high-level feature output by the cross-correlation convolutional layer, and inputting the first low-level feature and the second low-level feature into the cross-correlation convolutional layer to obtain a low-level feature output by the cross-correlation convolutional layer; and
   determining the position of the target object in the detection image based on the high-level feature output by the cross-correlation convolutional layer and the low-level feature output by the cross-correlation convolutional layer.

5. The non-transitory computer-readable storage medium of claim 4, wherein the determining the position of the target object in the detection image based on the high-level feature output by the cross-correlation convolutional layer and the low-level feature output by the cross-correlation convolutional layer comprises:

performing cross-relation convolution for the high-level feature output by the cross-correlation convolutional layer and the low-level feature output by the cross-correlation convolutional layer to obtain a general feature;

inputting the general feature into a softmax layer in the siamese network to obtain matching rate of each pixel point in the detection image with the target object output by the softmax layer; and determining the position of the target object in the detection image based on the matching rate of each pixel point in the detection image with the target object.

6. The non-transitory computer-readable storage medium of claim 4, wherein the determining the position of the target object in the image to be predicted based on the position of the target object in each target image comprises:

determining, in each target image, whether a first pixel position belongs to the position of the target object, wherein the first pixel position is any pixel position in image captured by the SPAD camera; and determining the first pixel position to belong to the position of the target object in the image to be predicted if the number of the target images in which the first pixel position belongs to the position of the target is greater than a preset threshold.

7. An electronic device, comprising:

a memory on which a computer program is stored; and a processor configured to execute the computer program in the memory to carry out a method for tracking target object comprising:

receiving at least one target image captured by a single photon avalanche diode (SPAD) camera before present moment;

for each target image, inputting the target image and a preset template image into a pre-trained siamese network to acquire a position of a target object in the target image output by the siamese network, wherein the template image includes the target object; and determining a position of the target object in an image to be predicted based on the position of the target object in each target image, wherein the image to be predicted is an image captured by the SPAD camera at the present moment;

wherein the inputting the target image and the preset template image into the pre-trained siamese network to acquire the position of the target object in the target image output by the siamese network comprises:

dividing the target image based on a preset detection area to obtain a detection image corresponding to the target image; and inputting the detection image and the template image into the siamese network to acquire the position of the target object in the detection image output by the siamese network;

wherein the inputting the detection image and the template image into the siamese network to acquire the position of the target object in the detection image output by the siamese network comprises:

inputting the detection image into a convolutional neural network (CNN) in the siamese network to obtain a first high-level feature and a first low-level feature output by the CNN;

inputting the template image into the CNN to obtain a second high-level feature and a second low-level feature output by the CNN;

inputting the first high-level feature and the second high-level feature into a cross-correlation convolutional layer to obtain a high-level feature output by the cross-correlation convolutional layer, and inputting the first low-level feature and the second low-level feature into the cross-correlation convolutional layer to obtain a low-level feature output by the cross-correlation convolutional layer; and determining the position of the target object in the detection image based on the high-level feature output by the cross-correlation convolutional layer and the low-level feature output by the cross-correlation convolutional layer.

8. The electronic device of claim 7, wherein the determining the position of the target object in the detection image based on the high-level feature output by the cross-correlation convolutional layer and the low-level feature output by the cross-correlation convolutional layer comprises:

performing cross-relation convolution for the high-level feature output by the cross-correlation convolutional layer and the low-level feature output by the cross-correlation convolutional layer to obtain a general feature;

inputting the general feature into a softmax layer in the siamese network to obtain matching rate of each pixel point in the detection image with the target object output by the softmax layer; and determining the position of the target object in the detection image based on the matching rate of each pixel point in the detection image with the target object.

9. The electronic device of claim 7, wherein the determining the position of the target object in the image to be predicted based on the position of the target object in each target images comprises:

* * * * *